United States Patent
Kageyama et al.

(10) Patent No.: US 10,752,726 B2
(45) Date of Patent: Aug. 25, 2020

(54) RESIN COMPOSITION

(71) Applicant: HOYA LENS THAILAND LTD., Thanyaburi, Patumthani (TH)

(72) Inventors: Yukio Kageyama, Tokyo (JP); Masahisa Kousaka, Tokyo (JP); Tomofumi Ohnishi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 15/992,839

(22) Filed: May 30, 2018

(65) Prior Publication Data

US 2018/0273673 A1    Sep. 27, 2018

Related U.S. Application Data

(63) Continuation of application No. PCT/JP2017/027558, filed on Jul. 28, 2017.

(30) Foreign Application Priority Data

Jul. 29, 2016  (JP) ................. 2016-150635

(51) Int. Cl.
| | |
|---|---|
| C08L 75/04 | (2006.01) |
| C08G 18/38 | (2006.01) |
| G02B 1/04 | (2006.01) |
| C08G 18/24 | (2006.01) |
| C08G 18/73 | (2006.01) |
| C08G 18/75 | (2006.01) |
| C08G 18/76 | (2006.01) |
| G02B 1/08 | (2006.01) |
| G02C 7/02 | (2006.01) |

(52) U.S. Cl.
CPC ....... *C08G 18/3868* (2013.01); *C08G 18/246* (2013.01); *C08G 18/3876* (2013.01); *C08G 18/73* (2013.01); *C08G 18/758* (2013.01); *C08G 18/7642* (2013.01); *G02B 1/04* (2013.01); *G02B 1/041* (2013.01); *G02B 1/08* (2013.01); *G02C 7/022* (2013.01)

(58) Field of Classification Search
CPC combination set(s) only.
See application file for complete search history.

(56) References Cited

U.S. PATENT DOCUMENTS

| | | | |
|---|---|---|---|
| 2010/0075154 A1* | 3/2010 | Hayashi | C08G 18/222 428/425.9 |
| 2011/0224371 A1 | 9/2011 | Ryu et al. | |
| 2015/0370094 A1 | 12/2015 | Hashimoto et al. | |
| 2016/0017218 A1 | 1/2016 | Kojima et al. | |
| 2016/0304701 A1 | 10/2016 | Kakinuma et al. | |
| 2016/0313575 A1 | 10/2016 | Kakinuma et al. | |
| 2019/0025465 A1 | 1/2019 | Park | |

FOREIGN PATENT DOCUMENTS

| | | | |
|---|---|---|---|
| CN | 102245666 | A | 11/2011 |
| EP | 1580591 | A1 | 9/2005 |
| JP | H11-349658 | A | 12/1999 |
| JP | 2000-044647 | A | 2/2000 |
| JP | 2000044647 | * | 2/2000 |
| JP | 2000-162401 | A | 6/2000 |
| JP | 2003-105033 | A | 4/2003 |
| JP | 2005/023294 | A | 1/2005 |
| JP | 2005-121679 | A | 5/2005 |
| JP | 2015-118122 | A | 6/2015 |
| JP | 2016-060755 | A | 4/2016 |
| KR | 101582783 | B1 | 1/2016 |
| KR | 101612940 | B1 | 4/2016 |
| WO | 2014/027665 | A1 | 2/2014 |

OTHER PUBLICATIONS

Sep. 19, 2017 International Search Report issued in International Patent Application No. PCT/JP2017/027558.

* cited by examiner

*Primary Examiner* — Monique R Peets
(74) *Attorney, Agent, or Firm* — Oliff PLC

(57) ABSTRACT

To provide a resin composition having a good slightly bluish color tone, a spectacle lens including a base material made of the resin composition, and a method for producing the resin composition.

Provided is a resin composition obtained by polymerizing a polymerizable composition including a polyisocyanate compound and a polythiol compound. The polymerizable composition includes a dye L having an absorption maximum wavelength of 550 nm or more and 600 nm or less in a toluene solution of 20 ppm by mass, and a dye S having an absorption maximum wavelength of 500 nm or more and less than 550 nm in a toluene solution of 20 ppm by mass. A mass ratio [(mass of dye L)/(mass of dye S)] of the dye L to the dye S is 5 or more and 500 or less.

8 Claims, No Drawings

RESIN COMPOSITION

TECHNICAL FIELD

The present disclosure relates to a resin composition, a spectacle lens including a base material made of the resin composition, and a method for producing the resin composition.

BACKGROUND ART

A plastic spectacle lens is lightweight and excellent in impact durability as compared with a glass spectacle lens. For this reason, plastic spectacle lenses are mainstream in the current spectacle lens market.

As a method for producing a lens in which a resin is not colored yellow under the effect of additives and heat treatment, PTL 1 discloses a method for producing an urethane lens by adding a compound represented by a specific formula and performing cast polymerization when producing an urethane lens obtained by reacting one or two or more ester compounds selected from a polyisocyanate compound, a polyisothiocyanate compound, with an isothiocyanate compound having an isocyanate group and one or two or more active hydrogen compounds selected from a polyol compound, a polythiol compound, and a thiol compound having a hydroxy group.

CITATION LIST

Patent Literature

[PTL 1] Japanese Patent Application Publication No. 2000-162401

SUMMARY OF INVENTION

Technical Problem

In the production of spectacle lenses, yellowish lenses are sometimes obtained due to the effect of heat treatment during polymerization, and also the effect of additives, ultraviolet absorbers, and the like. The lens appearance creates an impression that the lens has deteriorated with time. Where cast polymerization is carried out by adding only a blue dye as in PTL 1, yellow of the resin and blue of the blue dye are mixed, and the lens has a greenish color tone. In other words, when the lens has a greenish color tone or when it has a yellowish or reddish color tone, the wearer of the spectacle lens is likely to have a poor wearing feeling. Meanwhile, when the lens has a slightly bluish color tone, the wearer of the spectacle lens is likely to have a good wearing feeling.

One example of the present disclosure provides a resin composition having a good slightly bluish color tone, a spectacle lens including a base material made of the resin composition, and a method for producing the resin composition.

Solution to Problem

As a result of intensive studies, the inventors of the present disclosure have found that the above problems can be solved by using a combination of dyes having specific absorption maximum wavelengths.

Thus, the present disclosure relates to the following three aspects [1] to [3].

[1] A resin composition obtained by polymerizing a polymerizable composition including a polyisocyanate compound and a polythiol compound, wherein
the polymerizable composition includes a dye L having an absorption maximum wavelength of 550 nm or more and 600 nm or less in a toluene solution of 20 ppm by mass, and a dye S having an absorption maximum wavelength of 500 nm or more and less than 550 nm in a toluene solution of 20 ppm by mass, and
a mass ratio [(mass of dye L)/(mass of dye S)] of the dye L to the dye S is 5 or more and 500 or less.

[2] A spectacle lens comprising a base material made of the resin composition according to [1].

[3] A method for producing a resin composition, comprising a step of polymerizing a polymerizable composition including a polyisocyanate compound and a polythiol compound, wherein
the polymerizable composition includes a dye L having an absorption maximum wavelength of 550 nm or more and 600 nm or less in a toluene solution of 20 ppm by mass, and a dye S having an absorption maximum wavelength of 500 nm or more and less than 550 nm in a toluene solution of 20 ppm by mass, and
a mass ratio [(mass of dye L)/(mass of dye S)] of the dye L to the dye S is 5 or more and 500 or less.

Advantageous Effects of Invention

According to the above-described example, it is possible to provide a resin composition having a good slightly bluish color tone, a spectacle lens including a base material made of the resin composition, and a method for producing the resin composition.

DESCRIPTION OF EMBODIMENTS

[Resin Composition]

The resin composition of one example is obtained by polymerizing a polymerizable composition including a polyisocyanate compound and a polythiol compound.

The polymerizable composition includes a dye L having an absorption maximum wavelength of 550 nm or more and 600 nm or less in a toluene solution of 20 ppm by mass (referred to hereinbelow simply as "dye L") and a dye S having an absorption maximum wavelength of 500 nm or more and less than 550 nm in a toluene solution of 20 ppm by mass (referred to hereinbelow simply as "dye S"), and a mass ratio [(mass of dye L)/(mass of dye S)] of the dye L to the dye S is 5 or more and 500 or less. According to the above-described example, it is possible to provide a resin composition having a slightly bluish color tone, a spectacle lens including a base material made of the resin composition, and a method for producing the resin composition.

<Polymerizable Composition>

The polymerizable composition includes a dye L, a dye S, a polyisocyanate compound, and a polythiol compound.

[Dye L]

From the viewpoint of obtaining a resin composition with a slightly bluish and good color tone, the dye L has an absorption maximum wavelength of 550 nm or more and 600 nm or less in a toluene solution of 20 ppm by mass. The absorption maximum wavelength may be the largest absorption maximum wavelength. The toluene solution of 20 ppm by mass means the ratio of a solute to the total toluene solution.

From the viewpoint of obtaining a resin composition with a slightly bluish and good color tone, the absorption maximum wavelength of the dye L may be 550 nm or more, 560 nm or more, and 580 nm or more. The absorption maximum wavelength of the dye L may be 600 nm or less, and 590 nm or less, from the viewpoint of obtaining a resin composition with a slightly bluish and good color tone.

The dye L can be exemplified by C. I. Solvent Violet 11, 13, 14, 26, 31, 33, 36, 37, 38, 45, 47, 48, 51, 59, 60; and C. I. Disperse Violet 26, 27, 28. Among these dyes, C. I. Disperse Violet 27 and C. I. Solvent Violet 13 and 31 may have better, and from the viewpoint of high stability and small changes in color tone in polymerization of the polymerizable composition, C. I. Disperse Violet 27 and C. I. Solvent Violet 13 may have better, and C. I. Disperse Violet 27 may have better.

[Dye S]

From the viewpoint of obtaining a resin composition with a slightly bluish and good color tone, the dye S has an absorption maximum wavelength of 500 nm or more and less than 550 nm in a toluene solution of 20 ppm by mass. The absorption maximum wavelength may be the largest maximum absorption wavelength.

From the viewpoint of obtaining a resin composition with a slightly bluish and good color tone, the absorption maximum wavelength of the dye S may be 500 nm or more, 510 nm or more, and 530 nm or more. Further, from the viewpoint of obtaining a resin composition with a slightly bluish and good color tone, the absorption maximum wavelength of the dye L may be 545 nm or less.

From the viewpoint of obtaining a resin composition with a slightly bluish and good color tone, the dye S may be exemplified by C. I. Solvent Red 24, 49, 52, 90, 91, 111, 118, 119, 122, 124, 125, 127, 130, 132, 143, 145, 146, 150, 151, 155, 160, 168, 169, 172, 175, 181, 207, 218, 222, 227, 230, 245, 247; and C. I. Acid Red 73, 80, 91, 92, 97, 138, 151, 211, 274, 289. Among these dyes, C. I. Solvent Red 52 and 146 may have better, and from the viewpoint of high stability and small changes in color tone in polymerization of the polymerizable composition, C. I. Solvent Red 52 may have better.

From the viewpoint of obtaining a resin composition with a slightly bluish and good color tone, the mass ratio [(mass of dye L)/(mass of dye S)] of the dye L and the dye S is 5 or more and 500 or less. The mass ratio of the dye L and the dye S may be 5 or more, 10 or more, 15 or more, and 20 or more. The mass ratio of the dye L and the dye S may be 500 or less, 300 or less, 200 or less, 150 or less, 100 or less, 80 or less, and 60 or less.

From the viewpoint of obtaining a resin composition with a slightly bluish and good color tone, the total amount of the dye L and the dye S to be added may be 10,000 ppb by mass or less, 8000 ppb by mass or less, 6000 ppb by mass or less, 3000 ppb by mass or less, 1500 ppb by mass or less, 1000 ppb by mass or less, 800 ppb by mass or less, and 600 ppb by mass or less. From the viewpoint of obtaining a resin composition with a slightly bluish and good color tone, the total amount of the dye L and the dye S to be added may be 200 ppb by mass or more, 300 ppb by mass or more, 350 ppb by mass or more, and 400 ppb by mass or more.

[Polythiol Compound]

Examples of the polythiol compound include an ester compound of a polyol compound and a mercapto group-containing carboxylic acid compound, a linear or branched aliphatic polythiol compound, a polythiol compound having an alicyclic structure, an aromatic polythiol compound, and the like.

In the ester compound of a polyol compound and a mercapto group-containing carboxylic acid compound, examples of the polyol compound include compounds having two or more hydroxyl groups in the molecule, such as ethylene glycol, diethylene glycol, propanediol, propanetriol, butanediol, trimethylolpropane, bis(2-hydroxyethyl) disulfide, pentaerythritol, dipentaerythritol, and the like.

Examples of the mercapto group-containing carboxylic acid compound include thioglycolic acid, mercaptopropionic acid, a thiolactic acid compound, thiosalicylic acid, and the like.

Examples of the ester compound of the polyol compound and the mercapto group-containing carboxylic acid compound include butanediol bis(2-mercaptoacetate), butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), dipentaerythritol hexakis(3-mercaptoacetate), dipentaerythritol hexakis(3-mercaptopropionate), and the like.

Examples of the linear or branched aliphatic polythiol compound include 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 2,2-dimethylpropane-1,3-dithiol, 3,4-dimethoxybutane-1,2-dithiol, 2,3-dimercapto-1-propanol, 1,2-dimercaptopropyl methyl ether, 2,3-dimercaptopropyl methyl ether, 2,2-bis(mercaptomethyl)-1,3-propanedithiol, bis(2-mercaptoethyl) ether, bis(2-mercaptoethyl) sulfide, bis(2-mercaptoethyl) disulfide, bis[(2-mercaptoethyl)thio]-3-mercaptopropane, bis(mercaptoethylthio)mercaptopropane, bis(mercaptomethyl)-3,6,9-trithiaundecane dithiol, and the like.

Examples of the polythiol compound having an alicyclic structure include 1,1-cyclohexanedithiol, 1,2-cyclohexanedithiol, methylcyclohexanedithiol, bis(mercaptomethyl)cyclohexane, bis(mercaptomethyl)dithiane, and the like.

Examples of the aromatic polythiol compound include dimercaptobenzene, bis(mercaptomethyl)benzene, bis(mercaptoethyl)benzene, trimercaptobenzene, tris(mercaptomethyl)benzene, tris(mercaptoethyl)benzene, dimercaptobiphenyl, 4,4'-dimercaptobibenzyl, 2,5-toluenedithiol, naphthalenedithiol, 2,4-dimethylbenzene-1,3-dithiol, 4,5-dimethylbenzene-1,3-dithiol, 9,10-anthracene dimethanethiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, and the like.

These polythiol compounds may be used singly or in combinations of two or more thereof.

The polythiol compound may be one or more selected from the group consisting of bis(mercaptomethyl)dithiane, pentaerythritol tetrakis(2-mercaptoacetate), pentaerythritol tetrakis(3-mercaptopropionate), bis(mercaptoethylthio)mercaptopropane, bis(mercaptomethyl)-3,6,9-trithiaundecanedithiol, trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate), and may be one or more selected from the group consisting of bis(mercaptomethyl)-3,6,9-trithiaundecanedithiol, pentaerythritol tetrakis(3-mercaptopropionate), bis(mercaptoethylthio)mercaptopropane.

Further, bis(mercaptomethyl)-3,6,9-trithiaundecanedithiol may be a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

The polythiol compound may have a b* value in the L*a*b* color system of 0.5 or more and 10.0 or less in transmitted light measurement with an optical path length of 10 mm.

In the present production method, even when a polythiol compound having a relatively high b* value is used, a resin composition having a slightly bluish and good color tone can be obtained.

The b* value of the polythiol compound may be 0.8 or more, 1.0 or more, 1.5 or more, and 2.0 or more.

From the viewpoint of obtaining a resin composition with a slightly bluish and good color tone, the b* value of the polythiol compound may be 8.0 or less, 5.0 or less, and 4.0 or less.

[Polyisocyanate Compound]

Examples of the polyisocyanate compound include an aromatic polyisocyanate compound, an alicyclic polyisocyanate compound, and a linear or branched aliphatic polyisocyanate compound.

Examples of the aromatic polyisocyanate compound include diisocyanatobenzene, 2,4-diisocyanatotoluene, ethylphenylene diisocyanate, isopropylphenylene diisocyanate, dimethylphenylene diisocyanate, diethylphenylene diisocyanate, diisopropyl phenylene diisocyanate, trimethylbenzene triisocyanate, benzene triisocyanate, biphenyl diisocyanate, toluidine diisocyanate, 4,4'-methylene bis(phenyl isocyanate), 4,4'-methylene bis(2-methylphenyl isocyanate), bibenzyl-4,4'-diisocyanate, bis(isocyanatophenyl)ethylene, xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethylphenyl)ether, 2-isocyanatophenyl-4-isocyanatophenyl sulfide, bis(4-isocyanatophenyl) sulfide, bis(4-isocyanatomethylphenyl) sulfide, bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, bis(3-methoxy-4-isocyanatophenyl) disulfide, bis(4-methoxy-3-isocyanatophenyl) disulfide, and the like.

Examples of the alicyclic polyisocyanate compound include diisocyanatocyclohexane, isophorone diisocyanate, bis(isocyanatomethyl)cyclohexane, dicyclohexylmethane diisocyanate, bis(isocyanatomethyl)bicycloheptane, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, 4,5-bis(isocyanatomethyl)-2-methyl-1,3-dithiolane, and the like.

Examples of the linear or branched aliphatic polyisocyanate compound include hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanate-4-isocyanatomethyloctane, bis(isocyanatoethyl) carbonate, bis(isocyanatoethyl) ether, lysine diisocyanatomethyl ester, lysine triisocyanate, bis(isocyanatomethyl) sulfide, bis(isocyanatoethyl) sulfide, bis(isocyanatopropyl) sulfide, bis(isocyanatohexyl) sulfide, bis(isocyanatomethyl) sulfone, bis(isocyanatomethyl) disulfide, bis(isocyanatoethyl) disulfide, bis(isocyanatopropyl) disulfide, bis(isocyanatomethylthio)methane, bis(isocyanatoethylthio)methane, bis(isocyanatomethylthio)ethane, bis(isocyanatoethylthio)ethane, 1,5-diisocyanato-2-isocyanatomethyl-3-pentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanatomethylthiophene, 4-isocyanatoethylthio-2,6-dithia-1,8-octane diisocyanate, 1,2-diisothiocyanatoethane, and 1,6-diisothiocyanatohexane.

One or two or more polyisocyanate compounds may be used.

The polyisocyanate compound may be one or more selected from the group consisting of xylylene diisocyanate, isophorone diisocyanate, hexamethylene diisocyanate, bis(isocyanatomethyl)cyclohexane, dicyclohexylmethane diisocyanate, and bis(isocyanatomethyl)bicycloheptane, and may be one or more selected from the group consisting of xylylene diisocyanate, bis(isocyanatomethyl)cyclohexane, dicyclohexylmethane diisocyanate, and bis(isocyanatomethyl)bicycloheptane.

Examples of combinations of the polythiol compound and the polyisocyanate compound include:

(1) xylylene diisocyanate and a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol, (2) bis(isocyanatomethyl)bicycloheptane and pentaerythritol tetrakis(3-mercaptopropionate), (3) dicyclohexylmethane diisocyanate and a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

The mixing ratio of the polyisocyanate compound and the polythiol mixture is such that the molar ratio of isocyanate groups to mercapto groups may be 0.5 or more, 0.80 or more, and 0.95 or more. The molar ratio may be 2.0 or less, 1.20 or less, and 1.05 or less.

[Other Components]

In addition to the dye L, the dye S, the polyisocyanate compound, and the polythiol compound, various additives such as an ultraviolet absorber, a polymerization catalyst, a release agent, an antioxidant, a coloring inhibitor, and a fluorescent whitening agent may be compounded.

A polymerizable composition is obtained by mixing the abovementioned various components by a usual method.

(Ultraviolet Absorber)

The ultraviolet absorber may have an absorption maximum wavelength of 345 nm or more in a chloroform solution.

Examples of the ultraviolet absorber include a benzophenone compound, a benzotriazole compound, dibenzoylmethane, 4-tert-butyl-4'-methoxybenzoylmethane, and the like.

Examples of the benzophenone compound include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, 2,2'-dihydroxy-4-methoxybenzophenone, and the like.

Examples of the benzotriazole compound include 2-(2-hydroxy-5-methylphenyl)-2H-benzotriazole, 2-(2-hydroxy-3,5-di-tert-butylphenyl)-5-chloro-2H-benzotriazole, 2-(2-hydroxy-3-tert-butyl-5-methylphenyl)-5-chloro-2H-benzotriazole, 2-(2-hydroxy-3,5-di-tert-amylphenyl)-2H-benzotriazole, 2-(2-hydroxy-3,5-di-tert-butylphenyl)-2H-benzotriazole, 2-(2-hydroxy-5-tert-butylphenyl)-2H-benzotriazole, 2-(2-hydroxy-5-tert-octylphenyl)-2H-benzotriazole, 2-(2-hydroxy-4-octyloxyphenyl)-2H-benzotriazole, and the like. These may be used singly or in combination of two or more thereof.

The amount of the ultraviolet absorber to be added may be 0.01 parts by mass or more, 0.05 parts by mass or more, 0.1 parts by mass or more, 0.3 parts by mass or more, 0.5 parts by mass or more, and 0.8 parts by mass or more, and 5 parts by mass or less, 3 parts by mass or less, 2 parts by mass or less, and 1 part by mass or less with respect to 100 parts by mass of the total amount of the polythiol compound and the polyisocyanate compound.

(Polymerization Catalyst)

The polymerization catalyst may be an organotin compound, an alkyl tin halide compound or an alkyl tin compound.

Examples of the alkyl tin halide compound include dibutyltin dichloride, dimethyltin dichloride, monomethyltin trichloride, trimethyltin chloride, tributyltin chloride, tributyltin fluoride, dimethyltin dibromide, and the like.

Examples of the alkyl tin compound include dibutyltin diacetate, dibutyltin dilaurate, and the like.

Among these, dibutyltin dichloride, dimethyltin dichloride, dibutyltin diacetate, and dibutyltin dilaurate may have better.

The amount of the polymerization catalyst to be added may be 0.001 parts by mass or more, 0.005 parts by mass or more, and 1 part by mass or less, 0.5 parts by mass or less, and 0.1 parts by mass or less with respect to 100 parts by mass of the total amount of the polythiol compound and the polyisocyanate compound.

(Release Agent)

Examples of the release agent include phosphoric acid ester compounds such as isopropyl acid phosphate, butyl acid phosphate, octyl acid phosphate, nonyl acid phosphate, decyl acid phosphate, isodecyl acid phosphate, isodecyl acid phosphate, tridecyl acid phosphate, stearyl acid phosphate, propylphenyl acid phosphate, butylphenyl acid phosphate, butoxyethyl acid phosphate, and the like. The phosphoric acid ester compound may be either a phosphoric acid monoester compound or a phosphoric acid diester compound, but may be a mixture of a phosphoric acid monoester compound and a phosphoric acid diester compound.

The amount of the release agent to be added may be 0.01 parts by mass or more, and 0.05 parts by mass or more, and 1.00 part by mass or less, and 0.50 parts by mass or less with respect to 100 parts by mass of the total amount of the polythiol compound and the polyisocyanate compound.

In the transmitted light measurement with the optical path length of 10 mm, the b* value of the polymerizable composition in the L*a*b* color system is 0.5 or more and 10.0 or less in the state where the dye L and the dye S are not added.

In the present production method, even when a polymerizable composition having a relatively high b* value is used, a resin composition with a slightly bluish and good color tone can be obtained.

The b* value of the polymerizable composition may be 0.8 or more, 1.0 or more, 1.5 or more, 2.0 or more, or 3.0 or more in a state where the dye L and the dye S are not added.

From the viewpoint of obtaining a resin composition with a slightly bluish and good color tone in a state where the dye L and the dye S are not added, the b* value of the polymerizable composition may be 8.0 or less, 5.0 or less, and 4.0 or less.

[Resin Composition]

The resin composition is obtained by polymerizing the polymerizable composition described above.

The resin composition may be an optical member.

Examples of the optical member include spectacle lenses, camera lenses, prisms, optical fibers, substrates for recording media used for optical disks, magnetic disks, etc., optical filters attached to a display of a computer, and the like.

Among them, a spectacle lens may have better, and a base material for a spectacle lens may have better.

When the optical member is a spectacle lens, the polymerization may be a cast polymerization method. The spectacle lens may be obtained, for example, by injecting the polymerizable composition into a mold die which is a combination of a glass or metal mold and a tape or a gasket and performing polymerization.

The method for producing the resin composition may include a step of polymerizing the above-mentioned polymerizable composition.

The polymerization conditions can be appropriately set according to the polymerizable composition.

The polymerization initiation temperature may be 0° C. or more, 10° C. or more, and 50° C. less, 40° C. or less. It may have better to raise the temperature from the polymerization initiation temperature, and then to heat and cure to form the composition. For example, the maximum raised temperature is usually 110° C. or more and 130° C. or less.

After completion of the polymerization, the spectacle lens may be released and annealing treatment may be performed. The temperature of the annealing treatment may be 100° C. to 150° C.

[Spectacle Lens]

The surface shape of the spectacle lens is not particularly limited, and may be any of a flat surface, a convex surface, a concave surface, and the like.

The spectacle lens may be any of a single focus lens, a multifocal lens, a progressive addition lens and the like. For example, as an example, with respect to a progressive addition lens, normally, a near portion region (near portion) and a progressive portion region (intermediate region) are included in a lower region, and a distant portion region (distant portion) is included in the lower region.

The spectacle lens may be a finish type spectacle lens or a semi-finish type spectacle lens.

The thickness and diameter of the spectacle lens (base material) are not particularly limited, but the thickness is usually 1 mm or more and 30 mm or less and the diameter is usually 50 mm or more and 100 mm or less.

The refractive index ne of the spectacle lens may be 1.53 or more, 1.55 or more, 1.58 or more, 1.60 or more, and 1.80 or less, 1.70 or less, and 1.67 or less.

A spectacle lens according to an embodiment of the present disclosure includes a base material made of the above-described resin composition.

The spectacle lens may further include one or more selected from the group consisting of a hard coat layer, a primer layer, an antireflection film, and a water repellent film.

The hard coat layer is provided for improving the scratch resistance and can be formed by coating a coating solution having a fine particulate inorganic substance such as an organosilicon compound, tin oxide, silicon oxide, zirconium oxide, titanium oxide, and the like.

The primer layer is provided for improving the impact resistance and includes, for example, polyurethane as a main component. Here, the polyurethane content may be 50% by mass or more in the primer layer.

Examples of the antireflection film include films obtained by laminating silicon oxide, titanium dioxide, zirconium oxide, tantalum oxide, and the like.

The water repellent film can be formed using an organosilicon compound having a fluorine atom.

The luminous transmittance of the spectacle lens may be 83% or more, 85% or more, and 88% or more. The luminous transmittance of the spectacle lens may be 100% or less, 99% or less, and 98% or less. The luminous transmittance is measured by the method described in JIS T 7333:2005.

With regard to the examples, content, and various physical properties of the above-described components, the present disclosure may arbitrarily combine the items described as exemplary or preferred ranges in the detailed description of the disclosure.

In addition, where the composition described in the examples is adjusted to the composition described in the detailed description of the disclosure, the embodiments relating to the disclosure can be carried out in the same manner as in the examples over the entire composition range claimed.

EXAMPLES

Specific examples are shown below, but the scope of the present invention is not limited by the below-described examples. In the following description, "parts" means "parts by mass".

Measurement and evaluation of various numerical values were carried out by the following methods.

[Measuring Methods]
[b* Value]

The b* value in the L*a*b* color system of the thiol compound and the polymerizable composition was measured under the following conditions by using a spectrophotometer U-3500 manufactured by Hitachi, Ltd.
Sample: no dilution
Measurement mode: transmittance
Optical path length: 10 mm

[Largest Absorption Maximum Wavelength ($\lambda_{max}$)]

The largest absorption maximum wavelength ($\lambda_{max}$) of the dyes was measured under the following conditions by using a spectrophotometer U-3500 manufactured by Hitachi, Ltd.
Sample: toluene solution (dye content: 20 ppm by mass)
Measurement mode: transmittance
Optical path length: 10 mm

[Evaluation of Lens Color Tone]

The external appearance was visually confirmed.

Evaluation of color tone was expressed by the standard of "Redness (Brightness) Yellowness", and it was carried out with the following criteria.

"Brightness" was visually marked as "5" for a slightly bluish and near colorless and transparent spectacle lens with a luminous transmittance of 88% and as "1" for a colored spectacle lens with a luminous transmittance of 80%.

"Redness" was "+++" when observed in red color, "++" when observed in reddish purple color, and "+" when observed in blue-purple color.

"Yellowness" was "+++" when observed in yellow, "++" when observed in somewhat yellow, and "+" when observed slightly yellow.

Brightness: Light 5•4•3 2•1 Dark
Redness: Strong +++•++•+ Weak
Yellowness: Strong +++•++•+ Weak When redness and yellowness are not displayed, it means that the lens has a blue color tone.

For reference, in the table, the colors which are visually confirmed are marked.

Example 1

(Production of Master Batch Solution)

A total of 0.1000 parts of Disperse Violet 27 and 0.0025 parts of Solvent Red 52 were added to 100.0 parts of xylylene diisocyanate and stirred and dissolved to obtain a master batch solution.

The largest absorption maximum wavelength of Disperse Violet 27 in a toluene solution of 20 ppm by mass was 586 nm.

The largest absorption maximum wavelength of Solvent Red 52 in a toluene solution of 20 ppm by mass was 543 nm.
(Production of Spectacle Lens)

A total of 50.52 parts of xylylene diisocyanate, 0.01 parts of dimethyltin dichloride as a catalyst, 0.10 parts of acidic phosphoric acid ester (JP-506H manufactured by Johoku Chemical Co., Ltd.) as a release agent, and 0.5 parts of an ultraviolet absorber (SEESORB 701, absorption wavelength: 340 nm, manufactured by Shipro Kasei Kaisha, Ltd.) were mixed and dissolved.

Then, 0.08 parts of the master batch solution was added and stirred and dissolved.

Further, 49.40 parts of a mixture T1 of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol was added and mixed to prepare a mixed homogeneous solution. The b* value of the mixture T1 was 2.5. The composition of the mixed homogeneous solution is shown in Table 1.

This mixed homogeneous solution was defoamed for 1 hour under a reduced pressure of 200 Pa and then filtered through a 5.0 μm PTFE (polytetrafluoroethylene) filter. The solution was then poured into a mold die for a lens made of a glass mold having a diameter of 75 mm and −4.00 D and a tape. The mold die was put into an electric furnace, gradually heated from 15° C. to 120° C. over 20 hours, and kept for 2 h. After completion of the polymerization, the mold die was taken out from the electric furnace and a spectacle lens was released therefrom. The obtained lens was further annealed at 120° C. for 3 h. The appearance of the obtained spectacle lens was evaluated, and the results are shown in Table 2.

Example 2

A lens was prepared in the same manner as in Example 1 except that the amount of xylylene diisocyanate in Example 1 was changed to 50.56 parts and the amount of the master batch solution was changed to 0.04 part. The composition of the mixed homogeneous solution is shown in Table 1. The appearance of the obtained spectacle lens was evaluated, and the results are shown in Table 2.

Example 3

(Production of Master Batch Solution)

A total of 0.100 parts of Disperse Violet 27 and 0.002 parts of Solvent Red 52 were added to 100.0 parts of bis(isocyanatomethyl)bicycloheptane and stirred and dissolved to obtain a master batch solution.
(Production of Spectacle Lens)

A total of 50.55 parts of bis(isocyanatomethyl)bicycloheptane, 0.05 parts of dimethyltin dichloride as a catalyst, 0.15 parts of acidic phosphoric acid ester (JP-506H manufactured by Johoku Chemical Co., Ltd.) as a release agent, and 1.00 part of an ultraviolet absorber (SEESORB 701, manufactured by Shipro Kasei Kaisha, Ltd.) were mixed and dissolved.

Then, 0.05 parts of the master batch solution was added and stirred and dissolved.

Further, 23.90 parts of pentaerythritol tetrakis(3-mercaptopropionate) and 25.50 parts of bis(mercaptoethylthio)mercaptopropane were added and mixed to prepare a mixed homogeneous solution. The composition of the mixed homogeneous solution is shown in Table 1.

The b* value of the mixture of pentaerythritol tetrakis(3-mercaptopropionate) and bis(mercaptoethylthio)mercaptopropane was 2.4.

This mixed homogeneous solution was defoamed for 1 hour under a reduced pressure of 200 Pa and then filtered through a 5.0 μm PTFE (polytetrafluoroethylene) filter. The solution was then poured into a mold die for a lens made of a glass mold having a diameter of 75 mm and −4.00 D and a tape. The mold die was put into an electric furnace, gradually heated from 15° C. to 120° C. over 20 hours, and kept for 2 h. After completion of the polymerization, the mold die was taken out from the electric furnace and a spectacle lens was released therefrom. The obtained lens was further annealed at 120° C. for 3 h. The appearance of the obtained spectacle lens was evaluated, and the results are shown in Table 2.

Example 4

A spectacle lens was prepared in the same manner as in Example 1 except that the formulation of the master batch solution was changed as follows.

A total of 0.1000 parts of Solvent Violet 31 and 0.0010 parts of Solvent Red 52 were added to 100.0 parts of xylylene diisocyanate and stirred and dissolved to obtain a master batch solution. The composition of the mixed homogeneous solution is shown in Table 1.

The absorption maximum wavelength of Solvent Violet 31 in a toluene solution of 20 ppm by mass was 555 nm.

The appearance of the obtained spectacle lens was evaluated, and the results are shown in Table 2.

Example 5

A spectacle lens was prepared in the same manner as in Example 1 except that the formulation of the master batch solution was changed as follows.

A total of 0.1000 parts of Disperse Violet 27 and 0.00125 parts of Solvent Red 146 were added to 100.0 parts of xylylene diisocyanate and stirred and dissolved to obtain a master batch solution. The composition of the mixed homogeneous solution is shown in Table 1.

The absorption maximum wavelength of Solvent Red 146 in a toluene solution of 20 ppm by mass was 515 nm.

The appearance of the obtained spectacle lens was evaluated, and the results are shown in Table 2.

Example 6

A spectacle lens was prepared in the same manner as in Example 3 except that the ultraviolet absorber in Example 3, was changed to 1.0 part (SEESORB 703, absorption wavelength: 353 nm, manufactured by Shipro Kasei Kaisha, Ltd.), bis(isocyanatomethyl)bicycloheptane was changed to 50.10 parts, and the master batch solution was changed to 0.50 parts. The composition of the mixed homogeneous solution is shown in Table 1.

However, the b* value of the mixture of pentaerythritol tetrakis(3-mercaptopropionate) and bis(mercaptoethylthio)mercaptopropane was 0.7.

The b* value of the polymerizable composition not including the dye L and the dye S was 6.8.

The appearance of the obtained spectacle lens was evaluated, and the results are shown in Table 2.

Example 7

A spectacle lens was prepared in the same manner as in Example 1 except that xylylene diisocyanate was changed to 50.50 parts and the master batch solution was changed to 0.10 part. The composition of the mixed homogeneous solution is shown in Table 1.

The appearance of the obtained spectacle lens was evaluated, and the results are shown in Table 2.

Example 8

A spectacle lens was prepared in the same manner as in Example 1 except that the formulation of the master batch solution was changed as follows.

A total of 0.1000 parts of Disperse Violet 27 and 0.0200 parts of Solvent Red 52 were added to 100.0 parts of xylylene diisocyanate and stirred and dissolved to obtain a master batch solution.

The master batch solution was changed from 0.08 parts to 0.05 parts and xylylene diisocyanate was changed from 50.52 parts of to 50.55 parts. The composition of the mixed homogeneous solution is shown in Table 1.

The appearance of the obtained spectacle lens was evaluated, and the results are shown in Table 2.

Example 9

A spectacle lens was prepared in the same manner as in Example 1 except that the formulation of the master batch solution was changed as follows.

A total of 0.1000 parts of Disperse Violet 27 and 0.0100 parts of Solvent Red 52 were added to 100.0 parts of xylylene diisocyanate and stirred and dissolved to obtain a master batch solution.

The master batch solution was changed from 0.08 parts to 0.05 parts and xylylene diisocyanate was changed from 50.52 parts of to 50.55 parts. The composition of the mixed homogeneous solution is shown in Table 1.

The appearance of the obtained spectacle lens was evaluated, and the results are shown in Table 2.

Example 10

A spectacle lens was prepared in the same manner as in Example 1 except that 0.45 parts of ultraviolet absorber (SEESORB 707, absorption wavelength: 345 nm, manufactured by Shipro Kasei Kaisha, Ltd.) was used. The composition of the mixed homogeneous solution is shown in Table 1.

The appearance of the obtained spectacle lens was evaluated, and the results are shown in Table 2.

Example 11

(Production of Master Batch Solution)

A total of 0.1000 parts of Disperse Violet 27 and 0.0025 parts of Solvent Red 52 were added to 100.0 parts of dicyclohexylmethane diisocyanate and stirred and dissolved to obtain a master batch solution.

(Production of Spectacle Lens)

A total of 58.82 parts of dicyclohexylmethane diisocyanate, 0.10 parts of dimethyltin dichloride as a catalyst, 0.10 parts of acidic phosphoric acid ester (JP-506H manufactured by Johoku Chemical Co., Ltd.) as a release agent, and 1.00 part of an ultraviolet absorber (SEESORB 707, absorption wavelength: 345 nm, manufactured by Shipro Kasei Kaisha, Ltd.) were mixed and dissolved.

Then, 0.08 parts of the master batch solution was added and stirred and dissolved.

Further, 41.10 parts of a mixture T1 of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol was added and mixed to prepare a mixed homogeneous solution. The composition of the mixed homogeneous solution is shown in Table 1. The b* value of the mixture T1 was 2.5.

This mixed homogeneous solution was defoamed for 1 hour under a reduced pressure of 200 Pa and then filtered through a 5.0 μm PTFE (polytetrafluoroethylene) filter. The solution was then poured into a mold die for a lens made of a glass mold having a diameter of 75 mm and −4.00 D and a tape. The mold die was put into an electric furnace, gradually heated from 15° C. to 120° C. over 20 hours, and kept for 2 h. After completion of the polymerization, the mold die was taken out from the electric furnace and a spectacle lens was released therefrom. The obtained lens was further annealed at 120° C. for 3 h. The appearance of the obtained spectacle lens was evaluated, and the results are shown in Table 2.

Example 12

(Production of Master Batch Solution)

A spectacle lens was prepared in the same manner as in Example 1 except that the formulation of the master batch solution was changed as follows.

A total of 0.1000 parts of Disperse Violet 27 and 0.0025 parts of Solvent Red 52 were added to 100.0 parts of xylylene diisocyanate and stirred and dissolved to obtain a master batch solution.

The master batch solution was changed from 0.08 parts to 0.02 parts and xylylene diisocyanate was changed from 50.52 parts of to 50.58 parts. The composition of the mixed homogeneous solution is shown in Table 1.

The appearance of the obtained spectacle lens was evaluated, and the results are shown in Table 2.

Example 13

(Production of Master Batch Solution)

A spectacle lens was prepared in the same manner as in Example 1 except that the formulation of the master batch solution was changed as follows.

A total of 0.1000 parts of Disperse Violet 27 and 0.0020 parts of Solvent Red 52 were added to 100.0 parts of xylylene diisocyanate and stirred and dissolved to obtain a master batch solution.

The master batch solution was changed from 0.08 parts to 0.80 parts and xylylene diisocyanate was changed from 50.52 parts of to 49.8 parts. The composition of the mixed homogeneous solution is shown in Table 1.

The appearance of the obtained spectacle lens was evaluated, and the results are shown in Table 2.

Example 14

(Production of Master Batch Solution)

A spectacle lens was prepared in the same manner as in Example 1 except that the formulation of the master batch solution was changed as follows.

A total of 0.1000 parts of Disperse Violet 27 and 0.0002 parts of Solvent Red 52 were added to 100.0 parts of xylylene diisocyanate and stirred and dissolved to obtain a master batch solution. The composition of the mixed homogeneous solution is shown in Table 1.

The appearance of the obtained spectacle lens was evaluated, and the results are shown in Table 2.

Example 15

(Production of Master Batch Solution)

A spectacle lens was prepared in the same manner as in Example 1 except that the formulation of the master batch solution was changed as follows.

A total of 0.1000 parts of Disperse Violet 27 and 0.0005 parts of Solvent Red 52 were added to 100.0 parts of xylylene diisocyanate and stirred and dissolved to obtain a master batch solution. The composition of the mixed homogeneous solution is shown in Table 1.

The appearance of the obtained spectacle lens was evaluated, and the results are shown in Table 2.

Example 16

(Production of Master Batch Solution)

A spectacle lens was prepared in the same manner as in Example 1 except that the formulation of the master batch solution was changed as follows.

A total of 0.1000 parts of Disperse Violet 27 and 0.0031 parts of Solvent Red 52 were added to 100.0 parts of xylylene diisocyanate and stirred and dissolved to obtain a master batch solution.

The master batch solution was changed from 0.08 parts to 0.96 parts and xylylene diisocyanate was changed from 50.52 parts of to 49.64 parts. The composition of the mixed homogeneous solution is shown in Table 1.

The appearance of the obtained spectacle lens was evaluated, and the results are shown in Table 2.

Example 17

(Production of Master Batch Solution)

A spectacle lens was prepared in the same manner as in Example 1 except that the formulation of the master batch solution was changed as follows.

A total of 0.1000 parts of Solvent Violet 31 and 0.0025 parts of Solvent Red 146 were added to 100.0 parts of xylylene diisocyanate and stirred and dissolved to obtain a master batch solution.

The master batch solution was changed from 0.08 parts to 0.06 parts and xylylene diisocyanate was changed from 50.52 parts of to 50.54 parts. The composition of the mixed homogeneous solution is shown in Table 1.

The appearance of the obtained spectacle lens was evaluated, and the results are shown in Table 2.

Comparative Example 1

A spectacle lens was prepared in the same manner as in Example 1 except that Disperse Violet 27 was changed to Solvent Violet 13, and Solvent Red 52 was not used. The composition of the mixed homogeneous solution is shown in Table 1.

The largest absorption maximum wavelength of Solvent Violet 13 in a toluene solution of 20 ppm by mass was 585 nm.

The appearance of the obtained spectacle lens was evaluated, and the results are shown in Table 2.

Comparative Example 2

A spectacle lens was prepared in the same manner as in Example 1 except that Solvent Red 52 was changed to 0.025 parts. The composition of the mixed homogeneous solution is shown in Table 1.

The appearance of the obtained spectacle lens was evaluated, and the results are shown in Table 2.

Comparative Example 3

A spectacle lens was prepared in the same manner as in Example 1 except that Disperse Violet 27 was changed to Solvent Blue 97. The composition of the mixed homogeneous solution is shown in Table 1.

The largest absorption maximum wavelength of Solvent Blue 97 in a toluene solution of 20 ppm by mass was 630 nm.

The appearance of the obtained spectacle lens was evaluated, and the results are shown in Table 2.

Comparative Example 4

A spectacle lens was prepared in the same manner as in Example 1 except that Disperse Violet 27 was not added and Solvent Red 52 was changed to 0.1025 parts. The composition of the mixed homogeneous solution is shown in Table 1.

The appearance of the obtained spectacle lens was evaluated, and the results are shown in Table 2.

TABLE 1

| | Polymerizable composition | | | | | | | | | | | | |
|---|---|---|---|---|---|---|---|---|---|---|---|---|---|
| | Dye | | | | Polyisocyanate | | Polythiol compound 1 | | Polythiol compound 2 | | Catalyst | Release agent | ultraviolet absorber | |
| | Dye L | | Dye S | | compound | | | | | | | | | |
| | Type | Amount added *1 (ppb by mass) | Type | Amount added *1 (ppb by mass) | Type | Amount added *2 (parts by mass) | Type | Amount added *2 (parts by mass) | Type | Amount added *2 (parts by mass) | Amount added *2 (parts by mass) | Amount added *2 (parts by mass) | Type | Amount added *2 (parts by mass) |
| Example 1 | DV27 | 800 | SR52 | 20 | I1 | 50.60 | T1 | 49.40 | — | — | 0.01 | 0.10 | U1 | 0.50 |
| Example 2 | DV27 | 400 | SR52 | 10 | I1 | 50.60 | T1 | 49.40 | — | — | 0.01 | 0.10 | U1 | 0.50 |
| Example 3 | DV27 | 500 | SR52 | 10 | I2 | 50.60 | T2 | 23.90 | T3 | 25.50 | 0.05 | 0.15 | U1 | 1.00 |
| Example 4 | SV31 | 800 | SR52 | 8 | I1 | 50.60 | T1 | 49.40 | — | — | 0.01 | 0.10 | U1 | 0.50 |
| Example 5 | DV27 | 800 | SR146 | 10 | I1 | 50.60 | T1 | 49.40 | — | — | 0.01 | 0.10 | U1 | 0.50 |
| Example 6 | DV27 | 5000 | SR52 | 100 | I2 | 50.60 | T2 | 23.90 | T3 | 25.50 | 0.05 | 0.15 | U2 | 1.00 |
| Example 7 | DV27 | 1000 | SR52 | 25 | I1 | 50.60 | T1 | 49.40 | — | — | 0.01 | 0.10 | U1 | 0.50 |
| Example 8 | DV27 | 500 | SR52 | 100 | I1 | 50.60 | T1 | 49.40 | — | — | 0.01 | 0.10 | U1 | 0.50 |
| Example 9 | DV27 | 500 | SR52 | 50 | I1 | 50.60 | T1 | 49.40 | — | — | 0.01 | 0.10 | U1 | 0.50 |
| Example 10 | DV27 | 800 | SR52 | 20 | I1 | 50.60 | T1 | 41.10 | — | — | 0.01 | 0.10 | U3 | 0.45 |
| Example 11 | DV27 | 800 | SR52 | 20 | I3 | 50.60 | T1 | 49.40 | — | — | 0.10 | 0.10 | U3 | 1.00 |
| Example 12 | DV27 | 200 | SR52 | 5 | I1 | 50.60 | T1 | 49.40 | — | — | 0.01 | 0.10 | U1 | 0.50 |
| Example 13 | DV27 | 8000 | SR52 | 160 | I1 | 50.60 | T1 | 49.40 | — | — | 0.01 | 0.10 | U2 | 1.00 |
| Example 14 | DV27 | 800 | SR52 | 1.6 | I1 | 50.60 | T1 | 49.40 | — | — | 0.01 | 0.10 | U1 | 0.50 |
| Example 15 | DV27 | 800 | SR52 | 4 | I1 | 50.60 | T1 | 49.40 | — | — | 0.01 | 0.10 | U1 | 0.50 |
| Example 16 | DV27 | 9600 | SR52 | 300 | I1 | 50.60 | T1 | 49.40 | — | — | 0.01 | 0.10 | U2 | 1.50 |
| Example 17 | SV31 | 600 | SR146 | 15 | I1 | 50.60 | T1 | 49.40 | — | — | 0.01 | 0.10 | U1 | 0.50 |
| Comparative Example 1 | SV13 | 800 | — | 0 | I1 | 50.60 | T1 | 49.40 | — | — | 0.01 | 0.10 | U1 | 0.50 |
| Comparative Example 2 | DV27 | 800 | SR52 | 200 | I1 | 50.60 | T1 | 49.40 | — | — | 0.01 | 0.10 | U1 | 0.50 |
| Comparative Example 3 | SB97 | 800 | SR52 | 20 | I1 | 50.60 | T1 | 49.40 | — | — | 0.01 | 0.10 | U1 | 0.50 |
| Comparative Example 4 | — | — | SR52 | 0 | I1 | 50.60 | T1 | 49.40 | — | — | 0.01 | 0.10 | U1 | 0.50 |

The notations and abbreviations in Table 1 are as follows.
*1 Amount of dye added to optical material (ppb by mass)
*2 Amount added (parts by mass) based on 100 parts by mass in total of the isocyanate compound and the thiol compound
DV27: Disperse Violet 27 ($\lambda_{max}$ 586 nm)
SV31: Solvent Violet 31 ($\lambda_{max}$ 555 nm)
SV13: Solvent Violet 13 ($\lambda_{max}$ 585 nm)
SB97: Solvent Blue 97 ($\lambda_{max}$ 630 nm)
SR 52: Solvent Red 52 ($\lambda_{max}$ 543 nm)
SR146: Solvent Red 146 ($\lambda_{max}$ 515 nm)
I1: xylylene diisocyanate
I2: bis (isocyanatomethyl)bicycloheptane
I3: dicyclohexylmethane diisocyanate
T1: a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol
T2: pentaerythritol tetrakis(3-mercaptoproprionate)
T3: bis(mercaptoethylthio)mercaptopropane
U1: 2-(2-hydroxy-5-methylphenyl)-2H-benzptriazole: "SEESORB 701" (manufactured by Shipro Kasei Kaisha, Ltd.)
U2: 2-(2-hydroxy-3-tert-butyl-5-methylphenyl) 5-chloro-2H-benzotriazole: "SEESORB 703" (manufactured by Shipro Kasei Kaisha, Ltd.)
U3: 2-(2-hydroxy-4-octyloxyphenyl)-2H-benzotriazole: "SEESORB 707" (manufactured by Shipro Kasei Kaisha, Ltd.)
Catalyst: dimethyltin dichloride
Release agent: butoxyethyl acid phosphate (mixture of phosphoric acid monoester and phosphoric acid diester) "JP-506H" (manufactured by Johoku Chemical Co., Ltd.)

TABLE 2

| | Polymerizable composition | | | | | | | | | | | |
|---|---|---|---|---|---|---|---|---|---|---|---|---|
| | Dye | | | | | | | | | | | |
| | Dye L | | Dye S | | | Total amount added of dyes *1 | Polythiol compound | Polymerizable compound *2 | Evaluation | | | |
| | | | | | | | | | Color tone evaluation | | | Visual |
| | $\lambda_{max}$ (nm) | Amount added *1 (ppb by mass) | $\lambda_{max}$ (nm) | Amount added *1 (ppb by mass) | L/S | (ppb by mass) | b* value | b* value | Redness | (Brightness) | Yellow-ness | color tone |
| Example 1 | 586 | 800 | 543 | 20 | 40 | 820 | 2.5 | 1.8 | | (4) | | Blue |
| Example 2 | 586 | 400 | 543 | 10 | 40 | 410 | 0.8 | 1.1 | | (5) | | Light blue |
| Example 3 | 586 | 500 | 543 | 10 | 50 | 510 | 2.4 | 2 | | (5) | | Light blue |
| Example 4 | 555 | 800 | 543 | 8 | 100 | 808 | 2.5 | 1.8 | | (4) | | Blue |
| Example 5 | 586 | 800 | 515 | 10 | 80 | 810 | 2.5 | 1.8 | | (4) | | Blue |
| Example 6 | 586 | 5000 | 543 | 100 | 50 | 5100 | 0.7 | 6.8 | | (3) | | Somewhat dark blue |
| Example 7 | 586 | 1000 | 543 | 25 | 40 | 1025 | 2.5 | 1.8 | | (4) | | Blue |
| Example 8 | 586 | 500 | 543 | 100 | 5 | 600 | 2.5 | 1.8 | + | (4) | | Slightly reddish blue |
| Example 9 | 586 | 500 | 543 | 50 | 10 | 550 | 2.5 | 1.8 | + | (4) | | Slightly reddish blue |
| Example 10 | 586 | 800 | 543 | 20 | 40 | 820 | 2.5 | 1.8 | | (5) | | Light blue |
| Example 11 | 586 | 800 | 543 | 20 | 40 | 820 | 2.5 | 2 | | (5) | | Light blue |
| Example 12 | 586 | 200 | 543 | 5 | 40 | 205 | 2.5 | 1.8 | | (5) | + | Slightly yellowish blue |
| Example 13 | 586 | 8000 | 543 | 160 | 50 | 8160 | 2.5 | 1.8 | | (3) | | Somewhat dark blue |
| Example 14 | 586 | 800 | 543 | 1.6 | 500 | 802 | 2.5 | 1.8 | | (5) | | Light blue |
| Example 15 | 586 | 800 | 543 | 4 | 200 | 804 | 2.5 | 1.8 | | (5) | | Light blue |
| Example 16 | 586 | 9600 | 543 | 300 | 32 | 9900 | 2.5 | 1.8 | | (3) | | Somewhat dark blue |
| Example 17 | 555 | 600 | 515 | 15 | 40 | 615 | 2.5 | 1.8 | + | (4) | | Slightly reddish blue |
| Comparative Example 1 | 585 | 800 | — | 0 | — | 800 | 2.5 | 1.8 | | (4) | ++ | Yellowish blue |
| Comparative Example 2 | 586 | 800 | 543 | 200 | 4 | 1000 | 2.5 | 1.8 | ++ | (4) | | Violet |
| Comparative Example 3 | 630 | 800 | 543 | 20 | 40 | 820 | 2.5 | 1.8 | | (4) | +++ | Yellow |
| Comparative Example 4 | — | 0 | 543 | 100 | 0 | 100 | 2.5 | 1.8 | +++ | (2) | | Deep red |

*1 Amount of dye added to the optical material (ppb by mass).
*2 b* value of the entire composition when no dyes are added.
Color Tone Evaluation
Brightness: Light 5 · 4 · 3 · 2 · 1 Dark
Redness: Strong +++ · ++ · + Weak
Yellowness: Strong +++ · ++ · + Weak
*No + mark: blue By comparing the results of Examples 1 to 17 with the results of Comparative Examples 1 to 4, it can be understood that by including the dye L and the dye S at a specific mass ratio, it is possible to obtain a spectacle lens having a good slightly bluish color tone.

By comparing Example 1, Comparative Example 1 and Comparative Example 4, it can be understood that by including both the dye L and the dye S, it is possible to obtain a bluish spectacle lens with good transparency in which yellowness and redness are suppressed.

By comparing Example 8 and Comparative Example 2, it can be understood that when the mass ratio [(mass of dye L)/(mass of dye S)] of the dye L and the dye S is 5 or more, it is possible to obtain a slightly bluish spectacle lens with good transparency.

By comparing Example 1 and Comparative Example 3, it can be understood that because the absorption maximum wavelength of the dye L is 550 nm or more and 600 nm or less, it is possible to obtain a slightly bluish spectacle lens with good transparency.

According to the results of Examples 6, 13, and 16, although the brightness was lowered, since the lenses were close to transparent (not red or yellow), the color tone was good.

The disclosure is summarized hereinbelow.

The resin composition of the present disclosure is obtained by polymerizing a polymerizable composition including a polyisocyanate compound and a polythiol compound, wherein the polymerizable composition includes a dye L having an absorption maximum wavelength of 550 nm or more and 600 nm or less in a toluene solution of 20 ppm by mass, and a dye S having an absorption maximum wavelength of 500 nm or more and less than 550 nm in a toluene solution of 20 ppm by mass; and a mass ratio [(mass of dye L)/(mass of dye S)] of the dye L to the dye S is 5 or more and 500 or less.

According to one example described above, a resin composition having a good slightly bluish color tone is obtained.

It should be taken into account that the embodiments disclosed herein are exemplary in all respects and are not restrictive. The scope of the present disclosure is defined not by the description above but by the claims, and is intended to include all modifications within the meaning and scope equivalent to the claims.

The invention claimed is:

1. A resin composition obtained by polymerizing a polymerizable composition including a polyisocyanate compound and a polythiol compound, wherein
the polymerizable composition includes a dye L having an absorption maximum wavelength of 550 nm or more and 600 nm or less in a toluene solution of 20 ppm by mass, and a dye S having an absorption maximum wavelength of 500 nm or more and less than 550 nm in a toluene solution of 20 ppm by mass, and
a mass ratio [(mass of dye L)/(mass of dye S)] of the dye L to the dye S is 5 or more and 500 or less.

2. The resin composition according to claim 1, wherein the total amount of the dye L and the dye S to be added is 200 ppb by mass or more and 10,000 ppb by mass or less in the resin composition.

3. The resin composition according to claim 1, wherein the polyisocyanate compound is one or more selected from the group consisting of xylylene diisocyanate, isophorone diisocyanate, hexamethylene diisocyanate, bis(isocyanatomethyl)cyclohexane, dicyclohexylmethane diisocyanate, and bis(isocyanatomethyl)bicycloheptane.

4. The resin composition according to claim 1, wherein the polythiol compound is one or more selected from the group consisting of bis(mercaptomethyl)dithiane, pentaerythritol tetrakis(2-mercaptoacetate), pentaerythritol tetrakis(3-mercaptopropionate), bis(mercaptoethylthio)mercaptopropane, bis(mercaptomethyl)-3,6,9-trithiaundecanedithiol, trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate).

5. The resin composition according to claim 4, wherein bis(mercaptomethyl)-3,6,9-trithiaundecanedithiol is a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

6. The resin composition according to claim 1, wherein the polymerizable composition further includes an ultraviolet absorber.

7. A spectacle lens comprising a base material made of the resin composition according to claim 1.

8. A method for producing a resin composition, comprising a step of polymerizing a polymerizable composition including a polyisocyanate compound and a polythiol compound, wherein
the polymerizable composition includes a dye L having an absorption maximum wavelength of 550 nm or more and 600 nm or less in a toluene solution of 20 ppm by mass, and a dye S having an absorption maximum wavelength of 500 nm or more and less than 550 nm in a toluene solution of 20 ppm by mass, and
a mass ratio [(mass of dye L)/(mass of dye S)] of the dye L to the dye S is 5 or more and 500 or less.

* * * * *